United States Patent [19]

Collins

[11] Patent Number: 4,577,058
[45] Date of Patent: Mar. 18, 1986

[54] CURRENT-RATIO DIGITIZERS

[76] Inventor: Robert J. Collins, 36 Cannon Hill, Colehill, Wimborne, Dorset BH21 2TA, England

[21] Appl. No.: 600,823

[22] Filed: Apr. 16, 1984

[30] Foreign Application Priority Data

Apr. 22, 1983 [GB] United Kingdom ............... 8311043

[51] Int. Cl.⁴ ......................................... G08C 21/00
[52] U.S. Cl. .................................................. 178/18
[58] Field of Search ........................ 178/18, 19, 20; 364/520; 340/709

[56] References Cited

U.S. PATENT DOCUMENTS 3,461,454  8/1969  Steckenrider ..................... 178/19

FOREIGN PATENT DOCUMENTS

484536  1/1976  U.S.S.R. ............................ 178/19

Primary Examiner—Stafford D. Schreyer
Attorney, Agent, or Firm—Shoemaker and Mattare, Ltd.

[57] ABSTRACT

A digitizer table is provided under the surface of which are located a set of parallel X-conductors and a set of parallel Y-conductors arranged as a grid. They may be energized by electric currents to produce patterns of magnetic field close to the surface of the table. Means enables currents of constant polarity but of varying amplitude to be applied to successive pairs of conductors. A pen or cursor having sensor means therein responds to the local component of magnetic field perpendicular to the surface of the table. The location of the sensor between a pair of current carrying conductors is given by the ratio of the amplitudes of the currents applied to the two conductors of the pair when the resultant magnetic field component perpendicular to the surface of the table passes through a null value.

18 Claims, 10 Drawing Figures

CURRENT-RATIO DIGITIZERS

FIELD OF THE INVENTION

This invention relates to methods and apparatus for electronically ascertaining the plane coordinate position of a stylus or cursor in relation to a grid and datum of a digitiser table, at a high sampling rate and converting the resulting data to a form suitable for transmission to a computer or other data processing system. More particularly, the invention pertains to electronic apparatus capable of digitising the coordinate position of the stylus sufficiently fast to convert the movements of a stylus moving at the speed encountered in normal drawing or writing into a series of digitised coordinate positions accurately representing the path of the stylus.

Computers and data storage devices are able to process and store all the pertinent information contained in diagrams such as maps, drawings and plans providing the information is presented in an appropriate form. A digitising table such as described herein is able to present the information to the computer in the most suitable form at the time it is generated, or subsequently, merely by tracing over the original drawing. Moreover, when the data is captured as it is generated, this can be done without loss of speed or information.

BACKGROUND TO THE INVENTION

Electronic devices for converting the track of a stylus into numerical coordinates are known. For example a cathode ray tube and a "light pen" applied to the face of the tube are used in many applications. This method is, however, limited in application by size and ergonomic constraints.

There are many examples of coordinate ditigisers using conducting films, wherein the coordinates are determined by measuring the electrical potential at the point in question and relating this to the distance from the edge of the film. This type of digitiser may consist for example of two films which are brought into contact at the point of the stylus and the electrical potential developed at the point on one film is picked off by the second film. Applications of digitisers using conductive films are limited by the fact that means must be provided for the digitiser to distinguish between the stylus and other objects which may come into contact such as a hand holding the stylus. Other difficulties arise from the need to produce a film of adequately uniform resistivity over a large area and the need to convert an analogue quantity into digital form. Such systems using an electric field gradient are limited in size by the potentials which would be necessary for large areas. High voltages could present a hazard unless adequate insulation was employed. In some varieties of digitiser of this general type, the stylus must be in contact with the surface, so that it is not possible to interpose a sheet of paper between the digitiser surface and the stylus, nor anything which might disturb the uniformity of the potential gradient.

Some forms of conductive film digitiser use a capacitatively coupled stylus. In these devices, the film or the stylus is energised by an alternating electrical potential and the resulting electric field couples the two, inducing a voltage in the non-energised component. The resulting measured potential is a function of the film conductance and hence of the position of the stylus. Applications of digitisers using capacitive coupling are limited by loading effects caused by nearby earthed objects such as the user's hand, the body of the stylus or even the paper employed.

There are many other types of digitiser which use arrangements of conductive lines. In some, this arrangement takes the form of loops in which currents are induced by an energised stylus. The loops are arranged such that the induced currents in each loop uniquely define the position of the stylus on the surface. Other arrangements of conductive lines take the form of a grid of orthonal conductors under the surface of a table. In these arrangements, either the stylus or the grid may be energised, the other being used as the sensor. The coupling between the grid and the stylus may be either capacitative or inductive. Various mechanisms have been used to determine the stylus position on such digitiser surfaces. One such mechanism relies on the fact that the signal induced in the sensor is a maximum when the conductive line corresponding to a particular coordinate position is in closer proximity to the stylus than any other line.

In one form of digitiser as described in UK Pat. No. 1340522, more than one conductor is energised at a time, equal currents being passed in opposite directions in two adjacent conductors. The perpendicular components of the resulting magnetic fields add between the conductors but tend to cancel elsewhere. Detection of a perpendicular magnetic field exceeding a threshold level enables a cursor to be located with low precision. These techniques suffer from the shortcomings that the spatial resolution is limited to the spacing of the conductors and in order to resolve fine detail an equally fine conductor pitch must be employed.

Other mechanisms where several conductors are energised employ a variety of means to achieve greater resolution, but they all in one way or another rely on the relationship between electric field intensity and distance. One method using single or multiple energised conductors relies on the detection of phase changes in a periodic signal which occur when the spatial relationship between the conductors and stylus is changed. Such devices are limited in application due to the difficulty of measuring phase changes precisely and the complexity of the linear electronic processing circuits required.

There is thus a need for an accurate ditigiser of lower cost than those currently available, which does not have the shortcomings of those described above.

SUMMARY OF THE INVENTION

An object of the present invention is to provide a digitiser which has very high accuracy and resolution and which is able to determine the position of a stylus with great rapidity.

The present invention provides a digitiser table, under the surface of which are located a set of parallel X-conductors and a set of parallel Y-conductors arranged as a grid, which may be energised by electric currents to produce patterns of magnetic field close to the surface of the table; means for applying currents of constant polarity but of varying amplitude to successive pairs of conductors in a predetermined sequence; and a cursor or pen having sensor means therein responsive to the local component of magnetic field perpendicular to the surface of the table; the location of the sensor between a pair of current-carrying conductors being given by the ratio of the amplitudes of the currents applied to the two conductors of the pair when the resultant magnetic field component perpendicular to the surface of the table passes through a null value.

By this means there may be provided a digitiser of high accuracy and resolution, but using a coarse grid of conductors, which facilitates simplified control and low manufacturing costs. A digitiser according to the invention can be implemented either on a very small scale, such as may be required to capture the coordinates of, say, a signature, or on a large scale such as may be required for computer aided design at full scale, of quite large artifacts. The digitiser surface may be made translucent or even transparent to light, for rear illumination or for overlaying a back-projected image or picture, by virtue of the minimal obstruction to light offered by the widely spaced and thin conductors. It may be adjusted for accuracy and resolution by means of a programmed data processor. And it may provide a digitiser surface which is sufficiently thin that it may be placed between the pages of a book for transcribing information therefrom, the surface if desired being sufficiently thin and flexible that it can be rolled up for ease of transportation.

DESCRIPTION OF PREFERRED FEATURES

The sensor fitted to a pen tip will of necessity be of small dimensions and may consist of a coil provided with a magnetic circuit to concentrate the magnetic flux. When fitted to a cursor, which may have larger transverse dimensions than a pen, the sensor may consist of a flat air-cored coil of diameter commensurate with the spacing between successive conductors in the digitiser grid. Other possible designs of sensor include a Hall-effect crystal arranged to be sensitive to the component of magnetic field perpendicular to the plane of the digitiser table.

Variation of the ratio between the currents applied to two adjacent conductors may be achieved either by holding the amplitude of one current constant while that of the other is varied from a level several times, typically three times, higher than the fixed amplitude, in successive small steps to an amplitude several times, typically three times smaller than the fixed amplitude. Alternatively, the ratio between the two currents may be varied in steps between about 3:1 and 1:3 by simultaneously varying the amplitudes of both currents, one being progressively increased from a low to a high value, while the other is decreased from a high to a low value.

In practice it is found that by varying the ratios of current amplitude over the range indicated above, it is possible to move the null point of perpendicular field component between about 25% and 75% of the spacing between the pair of current-carrying conductors. To ensure coverage of all parts of a digitiser table it is therefore expedient to energise pairs of odd-numbered parallel conductors for one segment of the scan and then the pair of even numbered conductors interlaced with the odd pair for the next segment. This technique provides sufficient overlap of scans to ensure complete coverage of the area of the digitiser table.

By arranging the progressive variation of current amplitudes in each pair of conductors and the switching of currents between odd pairs and even pairs of conductors, it can be arranged that the null of resultant perpendicular magnetic field component progresses steadily from one side of the digitiser table to the other, first in the X direction and then in the Y direction.

Measurement of the times when the null is detected by the sensor then provides a precise measurement of the X and Y coordinates of the position of the sensor.

Another embodiment of the invention involves its use in combination with a technique previously disclosed in GB Pat. No. 1340522 (Quest). The technique disclosed therein also employs an array of parallel X and Y conductors arranged in a grid, but by passing equal currents in opposite directions in a pair of adjacent conductors it is possible to detect a maximum in the vertical component of magnetic field when the sensor lies between the two energised conductors. Using this technique, only one reading is taken for each pair of energised conductors, and as in the precision scan, successive pairs of conductors are energised to scan the magnetic field pattern across the whole digitiser table. This technique permits a rapid scan of low precision to be carried out in order to locate the pair of wires in each coordinate between which the sensor lies, and then it is only necessary to perform the slower precision scan for one pair, or in a preferred variant of the basic embodiment, in two pairs of adjacent conductors.

It is convenient to control and select the conductors using digital circuits, and therefore it is also expedient to use pulses of current to drive the conductors in both the high speed low precision scan and in the lower speed high precision scan. The necessary control of current sequences and amplitudes may conveniently be implemented either by means of a programmed microprocessor, or by a suitably adapted Uncommitted Logic Array.

BRIEF DESCRIPTION OF THE DRAWINGS

A preferred embodiment of the invention will now be described with reference to the accompanying drawings, wherein.

DETAILED DESCRIPTION OF PREFERRED EMBODIMENT

Figure 1:
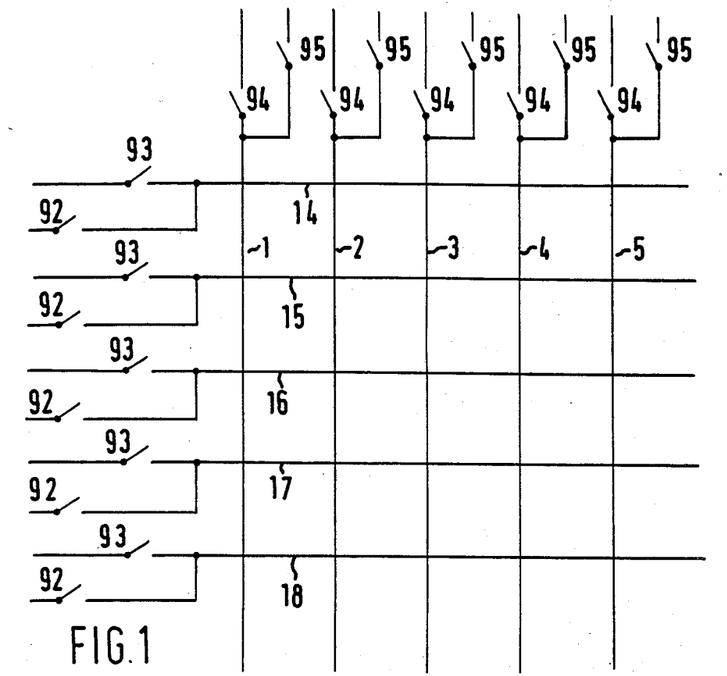
FIG. 1 illustrates an array of X and Y conductors forming a rectangular grid under the surface of a digitiser table.

FIG. 1 illustrates schematically a set of parallel X conductors (1, 2, 3, 4 . . . ) each connected to switches (94, 95) crossing a second set of Y conductors (14–18) at an angle, preferably a right angle, each of the Y conductors also being connected to switches (92, 93). As will be shown later, these switches (92–95) may be used to control electric currents passing through adjacent pairs of parallel conductors to produce patterns of magnetic field close to the surface (25) of a digitiser table under which the two sets of conductors are located.

Figure 2:
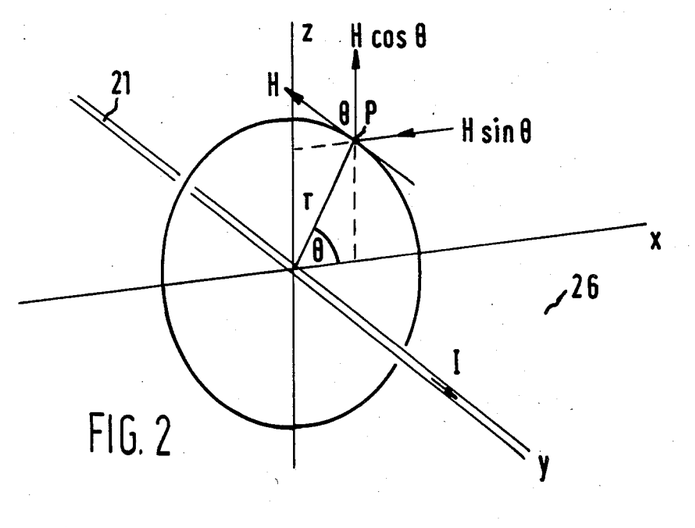
FIG. 2 illustrates the form of the magnetic field around a long straight conductor carrying a current.

The magnetic field close to a long straight wire (21) carrying a current I (ampere) has a value $I/2\pi r$ (tesla), where "r" is the radius from the wire to the point of measurement "P". The direction of the magnetic field vector is of course tangential to the circle of radius "r" and in accordance with Fleming's right hand rule as illustrated by FIG. 2.

In the absence of any disturbing influences, the lines of magnetic flux will form circular paths around the conductor (21) and if the conductor is located in a defined plane (26) with other similar conductors, the total magnetic field at point "P" may be resolved into components perpendicular to and parallel to the defined plane:

Perpendicular field:

$$H_z = \frac{I}{2\pi r} \cdot \cos\theta = \frac{I}{2\pi} \cdot \frac{x}{(x^2 + z^2)} \quad (1)$$

and Parallel field:

$$H_x = \frac{I}{2\pi r} \cdot \sin\theta = \frac{I}{2\pi} \cdot \frac{z}{(x^2 + z^2)} \quad (2)$$

where $\theta$ is the angle between the defined plane (26) and the radius (r) from the wire (21) to the point "P" and x and z are the coordinates of point "P" relative to the wire (21) measured perpendicular to its length, in the plane (26) and perpendicular to the plane respectively as shown in FIG. 2.

If x is appreciably larger than z, the perpendicular component will be correspondingly larger than the parallel one. In a practical embodiment as will be described below, x could readily be arranged at least 50 times larger than z, in which case measurement of the perpendicular component will be little disturbed by the parallel component.

Figure 3:
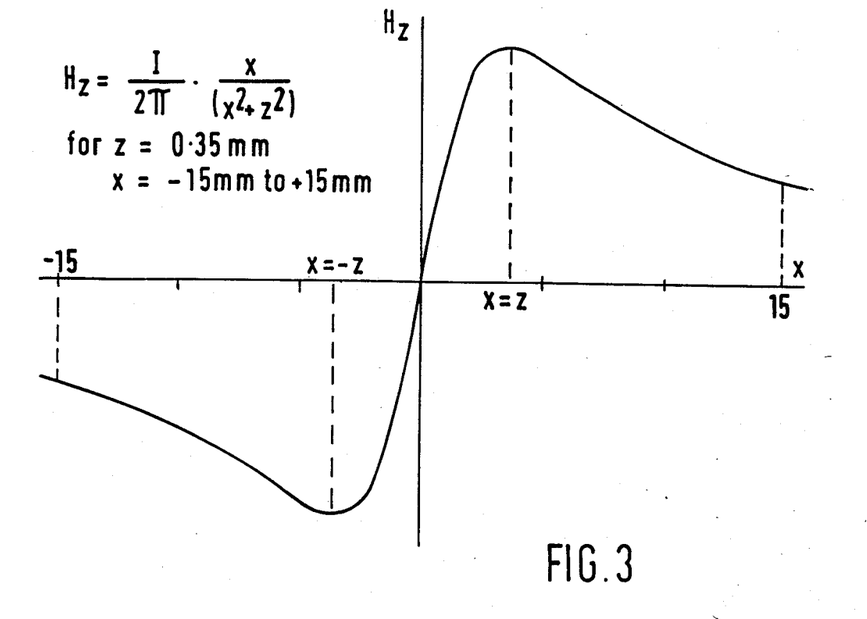
FIG. 3 shows the variation of the component of magnetic field perpendicular to the plane of a digitising table as the point of measurement is moved along a plane a small distance above the plane of the table and as it passes over a conductor which carries a current.

FIG. 3 shows how the perpendicular component of field varies as "P" is moved along a line (27) parallel to the plane (26) of the conductor (21) in a direction perpendicular to its length.

Figure 4A:
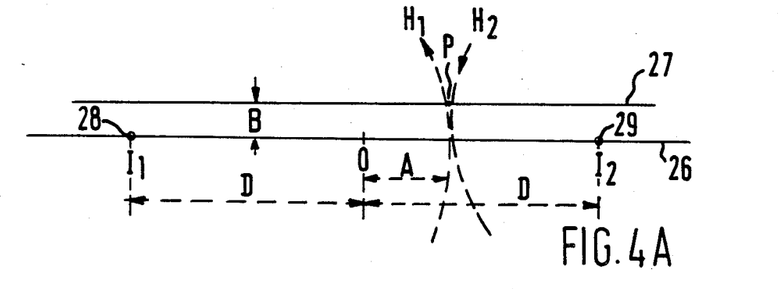
FIGS. 4A and 4B show the effect of currents in two adjacent parallel conductors when the currents are equal, and when each current amplitude is three times the other.

If two conductors (28, 29) are located within the defined plane (26) a distance 2D apart and identical electric currents "I" are passed through each of them, in the same direction, the parallel components of magnetic field will add, while the perpendicular components will be in opposite directions in the area between the two conductors, and will tend to cancel. At a point mid-way between the two conductors, which for the purpose of further analysis will be taken as the origin of the coordinates, the two opposing vectors will be equal and will therefore produce a resulting null of perpendicular field component. To the left of the null, the field due to the left hand conductor will predominate, to the right the field due to the right hand conductor will predominate.

Figure 4B:
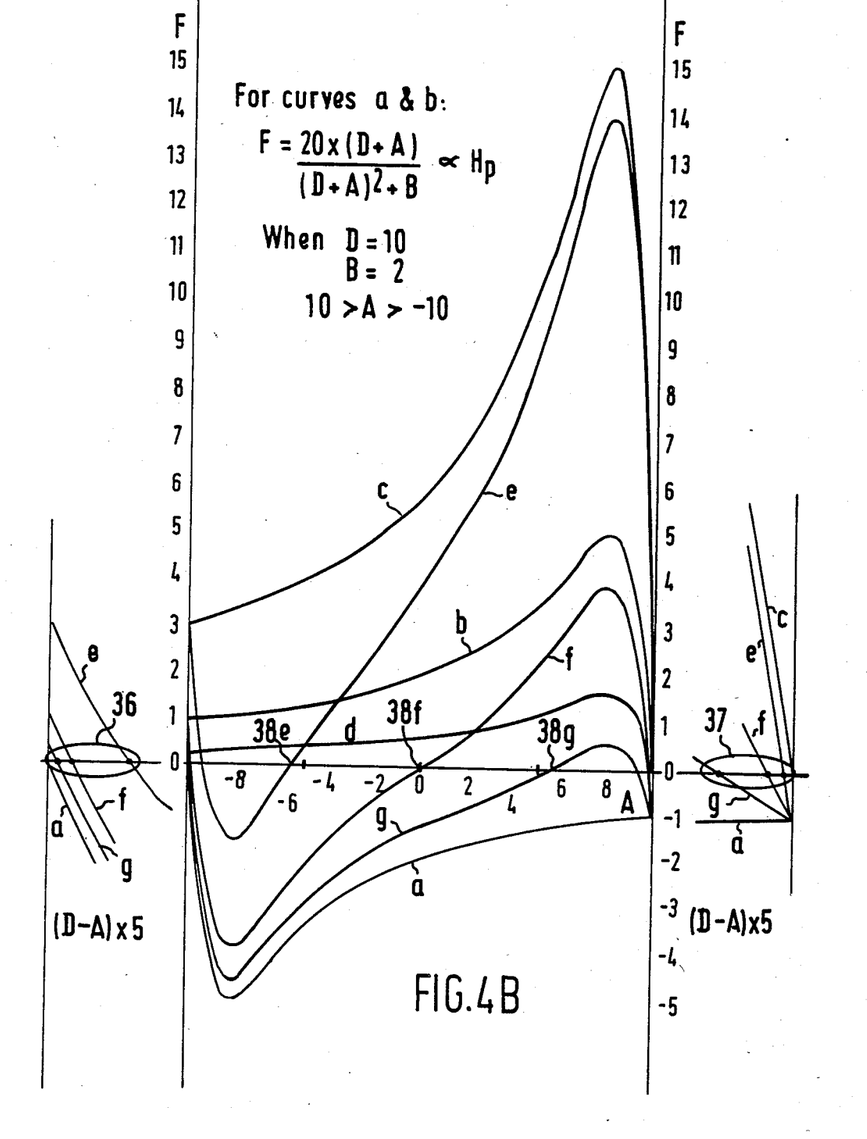

If the current in one or both conductors is changed, to make one larger than the other, the point of null perpendicular field component will move towards the conductor with the lower current. While these observations are true for a point "P" in the plane of the conductors, it remains substantially true when "P" is moved a small distance out of the plane, such that in the terms of FIG. 2, "x" remains appreciably larger than "z". FIG. 4B shows the variation of the perpendicular components of magnetic field with distance from each of two parallel conductors, when measured in a plane (27) spaced above the plane (26) containing the conductors, by a distance equal to one tenth of the spacing between the conductors.

Curve (a) relates to a fixed current amplitude in the left hand conductor (28) while curves (b), (c) and (d) related to current in the right hand conductor (29) equal in amplitude to that in curve (a) three times as high and ⅓ as high respectively.

Curves (e), (f) and (g) show the combined fields due to the current in conductor (28) with each of the three amplitudes of current in conductor (29). It will be seen that each of the curves (e, f, g) shows three zero crossings, one (36, 37) close to each conductor, which are shown in more detail on an expanded horizontal scale each side of the main graph, and one (38e, f, g) in the central part of the graph. The latter zero crossing moves across an area between $A = -D/2$ and $A = +D/2$ while the current ratio is varied between 3:1 and 1:3.

It has been shown above that the perpendicular field due to one conductor is $$H_z = \frac{I}{2\pi} \cdot \frac{x}{(x^2 + z^2)} \quad (3)$$

If, now, the distance of point "P" from the centerline between the two conductors is "A", and the spacing between the plane of "P" and that of the wires is "B", the above formula may be rewritten to represent the field components due to the currents in the two conductors in FIG. 4A as:

$$\frac{I_1}{2\pi} \cdot \frac{(D + A)}{(D + A)^2 + B^2} \text{ and } \frac{-I_2}{2\pi} \cdot \frac{(D - A)}{(D - A)^2 + B^2} \quad (4)$$

from which the position of "P" when the two magnetic fields cancel to produce a null, can be related to $I_1/I_2$ by:

$$\frac{I_1}{I_2} = \frac{(D - A) \cdot ((D + A)^2 + B^2)}{(D + A) \cdot ((D - A)^2 + B^2)} \quad (5)$$

Figure 5:
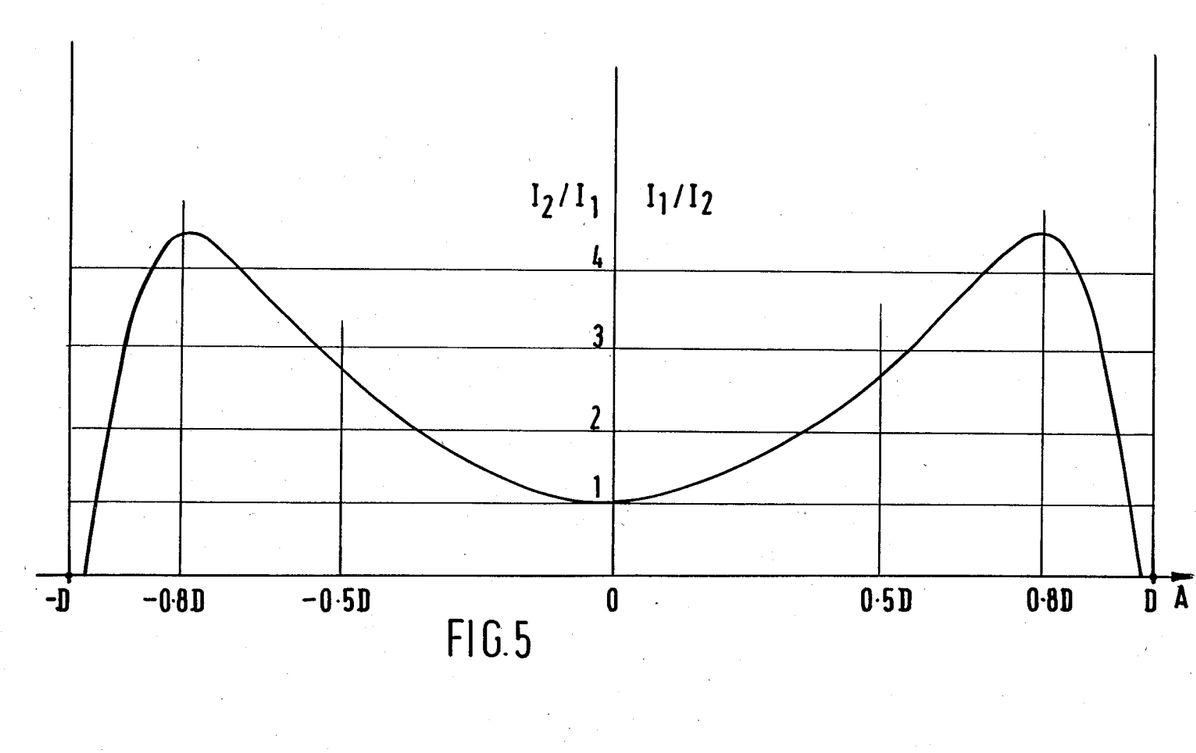
FIG. 5 shows a curve relating the ratio of the two currents to the position of the resulting null in the perpendicular component of their combined magnetic field.

FIG. 5 gives a typical curve relating the ratio $I_1/I_2$ and the distance "A" of point "P" from the mid point between the conductors for scale factors $D = 0.5$ and $B = 0.1$ (ie. $B/2D = 0.1$).

This curve clearly shows that the ratio $I_1/I_2$ is unity at the mid point ($A = 0$) and that it increases steadily as A is increased (to the right of the mid point) and $I_2/I_1$ increases steadily as A increases negatively (to the left of the mid point). It also confirms that $I_1/I_2$ has values about 3:1 and 1:3 when $A = \pm 0.5D$, and also that for this particular ratio of B/D, the ratio $I_1/I_2$ reaches a maximum value of about 4.5 when $A = 0.8D$. Beyond A=0.8D the ratio falls rapidly passing through unity again when A=0.96D.

If the area of interest can be restricted to the area bounded by the values of "A" between −0.5D and +0.5D, the current ratios will remain between 3:1 and 1:3 as long as B remains less than 0.1D.

Figure 6:
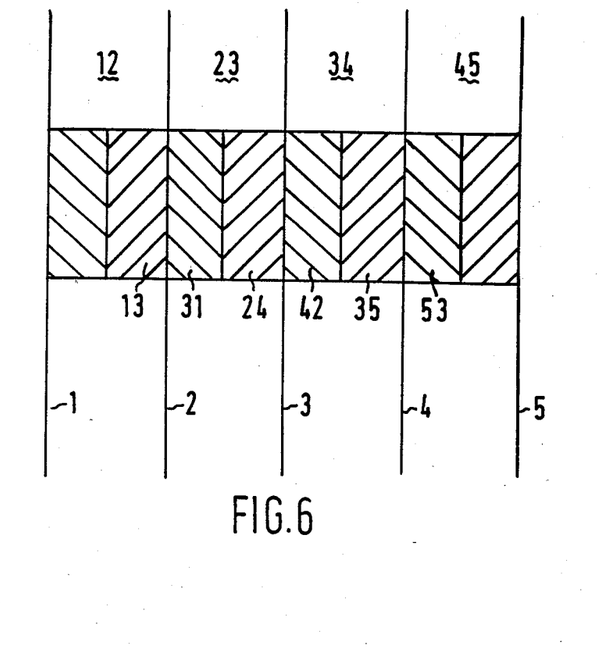
FIG. 6 shows an arrangement of interlaced conductors which may be used to improve the performance of the system.

Restriction of the range of measurement to within these limits can be arranged if the conductors carrying currents $I_1$ and $I_2$ are interlaced by a second pair of identical conductors which are scanned in the same way at a different time. This arrangement is illustrated in FIG. 6. Conductors (1) and (3) may be energised to locate a point "P" within areas (13) or (31) and then conductors (2) and (4) may be energised to locate a point within areas (24) or (42), the first digit of each pair used to label the areas identifies the conductor carrying the lower current. As successive pairs of conductors are energised in the sequence (1) and (3), (2) and (4), (3) and (5) and similarly across the whole series of conductors from one side of the digitiser table to the other, it is possible to cause the null of perpendicular magnetic field to index progressively in very small steps from one side to the other of the digitiser table.

If, however, a resolution of, say 0.001" is required over the surface of a digitiser table for example 50" wide, it would require some 50,000 readings to locate the null point "P" using the method as described so far, followed by a further 50,000 readings to locate "P" in the "Y" direction. At a likely sampling rate of up to 1 million per second, this would only permit 10 complete scans per second, which would be somewhat slow for real time sampling of a moving pen as a line was drawn in randomly varying directions, as for example in the writing of a signature or handwritten alphanumeric characters. It is much to be preferred that 100 complete scans per second be achieved.

This could be arranged if the high precision scan using the method explained above was only required in the specific area (for example (34)) where the point "P" was already known to lie. This could be established by a previous low precision high speed scan capable of locating point "P" to an accuracy equal to the spacing between two adjacent conductors.

Figure 7:
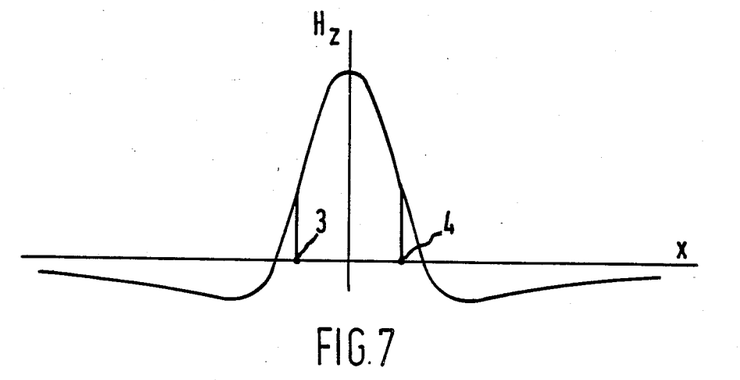
FIG. 7 shows how the perpendicular component of magnetic field varies along a plane parallel to but spaced a small distance above the plane of two parallel conductors energised by equal currents of opposite polarity.

A number of methods are possible for performing this coarse scan, but one of the most convenient, which is also compatible with the arrangement of conductors and sensor used for the precision scan, is generally described in GB Pat. No. 1340522 (Quest). This technique differs from that used in the precision scan mainly in that the energising currents applied to a pair of adjacent conductors are equal in amplitude, but of opposite polarity. In this case, the magnetic field components perpendicular to the plane containing the conductors add only between the two conductors and substract everywhere else on the table as illustrated in FIG. 7. Consequently the sensor detects a larger signal when it is located between the two energised conductors than it does at any other time. By relating the sensor output to the timing of the circuits used to energise the conductors (3,4), the location of the sensor (33), or point "P" in FIG. 4A may be established within the spacing of conductors (3) and (4) using only as many samples per scan of the table as there are conductors. This number will certainly be less than 100 and in some applications may be less than 10. Consequently, the coarse scan could be completed in less than 1 millisecond, and would allow the time taken for the precision scan to be reduced by a factor equal to the number of conductors employed, ten, fifty or one hundred as appropriate.

Since the area (34) in FIG. 6 in which the sensor might be located during the coarse scan includes both area (42) and (35) relevant to the precision scan, it would be necessary to carry out two precision scans after each coarse scan. The first precision scan would locate point "P" if it lay within area (42), the second scan would locate it if it lay within area (35).

It has already been indicated that a sampling rate of the order of 1 megahertz could be employed, and clearly this is compatible with the use of digital pulses, and it is in fact the intention that the system be implemented using digital techniques. Although it would be possible to work static magnetic field measurements, using for example a Hall effect crystal detector, the use of pulses of current with accurately controlled rise times of the order of 0.3 microseconds enables the magnetic field amplitudes to be measured in terms of induced voltages in a sensor coil. When used in a digitiser cursor of appreciable area, it is feasible for the sensor coil to have relatively few turns of relatively large area and to be of air-cored construction. The normal construction of such a cursor would automatically ensure that the plane of the coil remained parallel with the plane of the digitiser table, and that it would therefore measure only the perpendicular component of magnetic field. In the case of a sensor fitted at the tip of a pen, however, space to accommodate the coil would be at a premium, and therefore it is almost certain that such a sensor coil would require a magnetic circuit of ferrite or other suitable magnetic material to ensure sufficient sensitivity. Methods are already known to those skilled in the art, whereby the errors introduced when the pen is held at an angle other than perpendicular to the plane of the digitiser table, can be eliminated.

Figure 8:
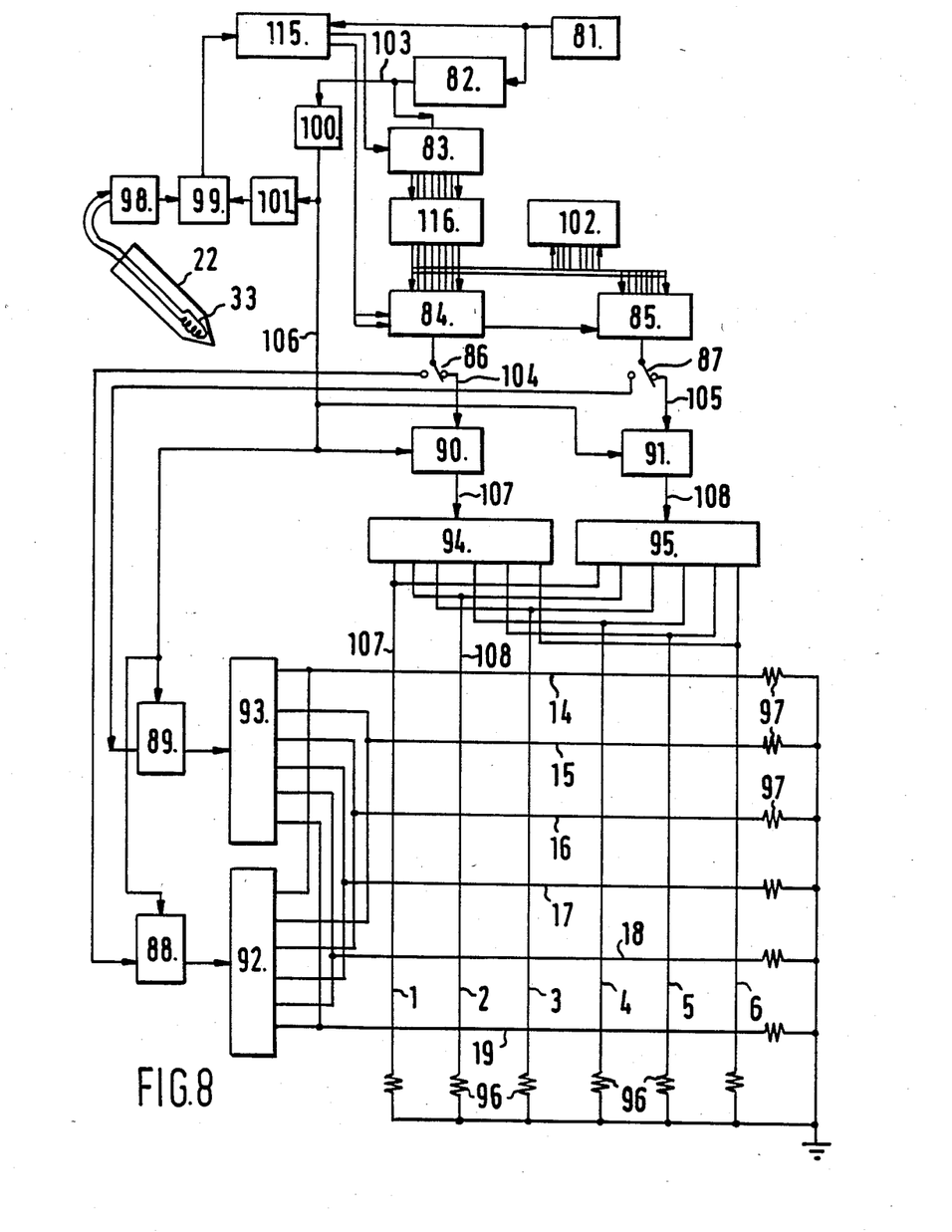
FIG. 8 is a block schematic diagram of an electronic circuit which may be used to drive the digitiser system, in two distinct modes.
Figure 9:
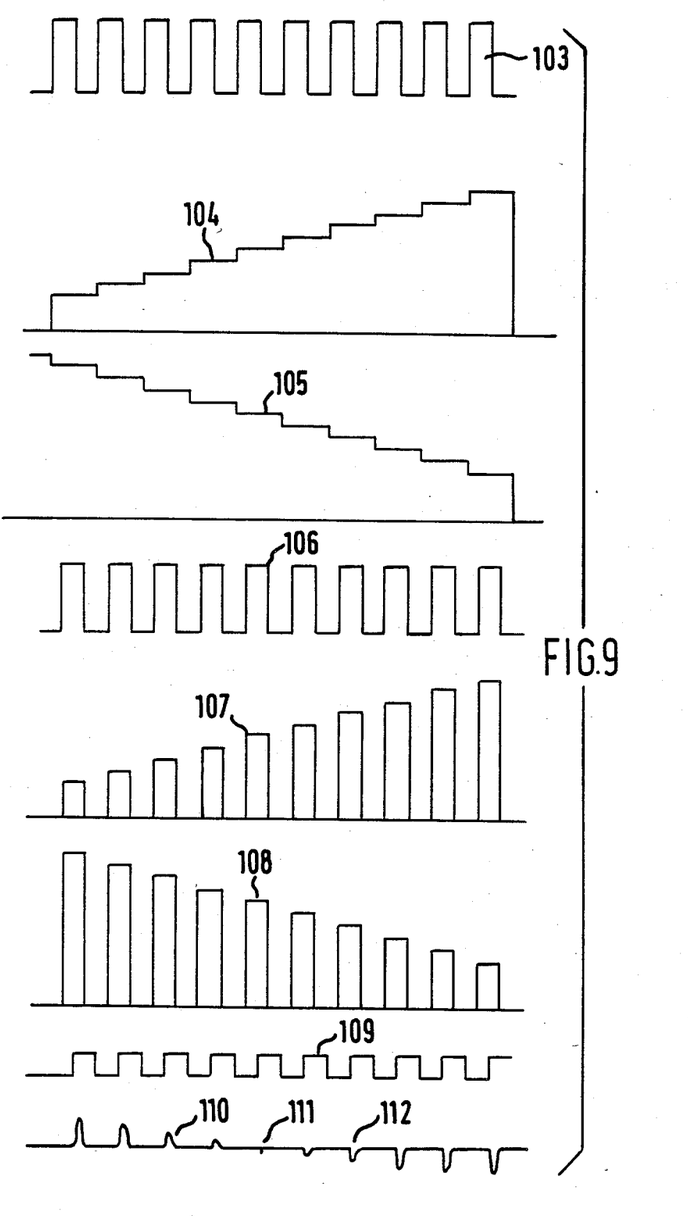
FIG. 9 shows the sequences and relative timings of pulses at several significant points in the circuit of FIG. 8.

FIG. 8 is a block schematic diagram of the electronic circuitry which may be used to drive and control the digitiser. Its operation will be described first for the precision mode of operation. FIG. 9 shows some of the signals occurring at specified points in the circuit during this mode.

Similar pulses are used in the coarse scan mode, except that there is no requirement for the amplitudes of the current pulses to be varied, though provision has to be made to drive alternate conductors with opposite polarities.

A conventional crystal oscillator (81) provides the basic timing for the system. Its clock rate is counted down by digital counter (82) to provide a slower clock rate (103) which is applied to delay circuit (100) to enable the current drivers (88, 89, 90, 91) to deliver pulses of specified amplitudes and controlled rise times through switch banks (92, 93, 94, 95) to the selected conductors (1–6 for X or 14–19 for Y). The current amplitudes and the time constants of the drive circuits are controlled in part by the series resistors (96, 97) terminating each of the conductors (1–6, 14–19).

Clock waveform (103) is also applied to an 8-bit counter (83) whose incrementing count is applied to Digital/Analogue Convertor (84), whose output (104) is therefore an ascending staircase waveform of voltage. At the same time, the inputs to Digital/Analogue Convertor (85) may be held at a fixed digital value or they may be set to the complement of the outputs from counter (83) to convertor (84) so applying a decrementing series of inputs to Digital/Analogue Convertor (85)

with the result that its output is a descending staircase waveform of voltage (105).

The outputs from the D/A Convertors (84, 85) are passed respectively to a pair of ganged two-way switches (86, 87) which direct these outputs either to the "X" current drivers (90, 91) or to the "Y" current drivers (88, 89). The successively incrementing current pulses (107) out of current drive (90) are applied to switch bank (94) which routes this series of current pulses to the first of the selected X drive conductors while the pulses output from current driver (91) are similarly routed by switch bank (95) to the other conductor of the selected pair. Depending on which method of operation is being used, the pulses output from the current drive (91) may be a series of successively decrementing pulses or they may be all of the same amplitude.

The series of pulses applied to the two selected conductors may begin with the amplitude of the first pulse from driver (91) three times the magnitude of the first pulse from driver (90) and continue until the last pulse from driver (91) is only ⅓ the amplitude of the pulse simultaneously supplied from driver (90). When this sequence has been completed, a control pulse to the switch banks (94, 95) causes the next pair of conductors to be selected and the sequence of pulses from the current drivers is repeated. This process continues until all pairs of alternate X conductors have been driven, after which switches (86) and (87) change over and repeat the entire operation for the "Y" coordinate using switch banks (92) and (93). When the system is being operated with a coarse followed by a fine scan, only two pairs of conductors will need to be selected for each of the X and Y scans in the precision mode.

When either the X or the Y scan is in progress, the pen (22) or cursor will be in close proximity to a point on the surface of the digitiser table (FIG. 1) and a pulse (110) will be induced in coil (33) by the changes of magnetic flux linking it. As long as the magnetic field to be detected, and consequently the flux, has a finite value, these voltages will exceed a predetermined threshold. When the field passes through a null value, however, the voltage induced in coil (23) will fall to zero (111) and the voltage pulses following the null will have the opposite polarity (112) from that measured before the null. Comparison of the polarities of the pulses either side of the null has a useful function in discriminating against the false nulls (36, 37) which may be detected when the sensor coil (33) is located very close to a current carrying conductor. The voltage signal (110) induced in coil (33) is amplified in preamplifier (98) before application to the zero-detection circuit (99), a strobed output from which is fed back to the control logic (115), to signal that the null has been found. On receipt of this signal the control logic may stop the 8-bit counter (83) and arrange for an appropriate signal to be generated to display the location of the pen on visual display (102) or for an appropriately coded signal to be sent to associated data processing apparatus. A register may be provided to store the X coordinate while the Y coordinate is being determined or vice versa.

During the coarse scan mode, the inputs to both D/A Convertors (84, 85) are set to fixed levels, the counter (83) being disabled. Arrangements are made either for drivers (88–91) to be capable of driving current pulses of either positive or negative polarity into the selected conductors, or it may be arranged that alternate wires are connected in alternate polarity to the outputs of switch banks (92, 93, 94, 95), so ensuring that in the coarse mode, neighbouring conductors pass current in the opposite directions. In the precision mode, where next-but-one neighbouring conductors are driven, the currents are in the same direction, although the polarity would alternate between successive scans. A simple logical correction could compensate for the reversed polarity of signal which would result in the sensor coil.

The switches in switch banks (92, 93, 94, 95) may be high speed "Darlington" transistor switches, selected in the appropriate sequence by outputs from digital multiplexors.

The Control Logic module (115) may take the form of a general purpose microprocesor suitably programmed with firmware held in a Read Only Memory, or it may be a specially prepared module manufactured by masking a mass-produced Uncommitted Logic Array (ULA).

As may be clearly seen from FIG. 5, the law relating the current ratio $I_1/I_2$ to the position of the null point between two current-carrying conductors is not linear, nor will the ratio $I_1/I_2$ change linearly with time if it is dependent on equal increments of both $I_1$ and $I_2$ as one increases and the other decreases in equal duration time slots, but both of these non-linear laws are accurately repeatable from scan to scan. If it is required to derive outputs which are linearly related to length in the X and Y coordinate directions, this may be arranged conveniently by the use of a look-up table stored in a Read Only Memory (116).

Such a look-up table may perform either of two functions.

Firstly, the look-up table may be interposed between the 8-bit counter (83) and the D/A convertors (84, 85) so that after each increment by which the counter increases, a new address in memory is selected, and at each address is stored the appropriate inputs to the D/A convertors to ensure that the current ratios applied to the two conductors cause the successive positions of the null in the perpendicular component of magnetic field to be equally spaced, thus ensuring a linear readout.

The second method wherein a look-up table may be used to linearise the digitiser readout, is to connect the output from the 8-bit counter (83) to the address inputs of the Read Only Memory to select successive addresses therein, and to have stored at these successive addresses, the true values of the successive positions of the null points of the vertical component of magnetic field as the successive uncorrected steps of current amplitude are applied to the conductors.

In the event that high accuracy may be required with the use of a modest memory capacity, the data stored in memory (116) could be limited to the progressive corrections necessary at each step to compensate for the departure of that step from the linear law which would obtain without such a correction.

In addition to the corrections provided for as above, which enable the non-linear relationship between digital counts in counter (83) and successive positions of the null-point (38) due to the non-linear laws inherent in the theory of the system, corrections may also be implemented at the same time for any random variations in the spacing of the X conductors (1–6) or the Y conductors (14–19) of the digitiser table. These errors may vary from one table to another, but will remain constant for one table and can therefore be compensated for in the PROM module.

The PROM may also be used to provide flexibility in the operation of the system by, for example, facilitating changes in the sizes and numbers of incremental steps of current applied to the conductors in the precision mode, thereby providing variable resolution which may be optimised for different applications.

I claim:

1. A digitiser table, under the surface of which are located a set of parallel X-conductors and a set of parallel Y-conductors arranged as a grid, which may be energised by electric currents to produce patterns of magnetic field close to the surface of the table; means for applying currents of constant polarity but of varying amplitude to successive pairs of conductors in a predetermined sequence; and means movable relative to said table and having sensor means therein responsive to the local component of magnetic field perpendicular to the surface of the table; location of the sensor means between a pair of current-carrying conductors being given by the ratio of amplitudes of the currents applied to the two conductors of the pair when the resultant magnetic field component perpendicular to the surface of the table passes through a null value.

2. Apparatus as claimed in claim 1, wherein the sensor means is fitted in a pen and consists of a small coil enclosed in a magnetic circuit with a pole gap arranged to detect changes in the component of magnetic flux perpendicular to the plane of the digitiser surface.

3. Apparatus as claimed in claim 1, wherein the sensor means fitted to a cursor consists of an air cored coil of cross section commensurate with spacing between the conductors of the digitiser table, arranged to detect changes in the component of magnetic flux perpendicular to the plane of the digitiser surface within an area enclosed by an X-pair and a Y-pair of current carrying conductors.

4. Apparatus as claimed in claim 1, wherein the sensor means fitted to the cursor means is a Hall-effect crystal sensitive to the component of magnetic flux perpendicular to the plane of the digitiser surface.

5. Apparatus as claimed in claim 1, wherein the current amplitude in one conductor of the pair is maintained constant while that in the other conductor is varied within a range from 25% to 400% of the fixed amplitude.

6. Apparatus as claimed in claim 1, wherein the current amplitude in one conductor is increased in steps within a range from 50% to 200% of a geometric mean amplitude, while that in the other conductor of the pair is simultaneously decreased within a range from 200% to 50% of a geometric mean amplitude.

7. Apparatus as claimed in claim 1, wherein the current amplitude in one conductor is increased in steps within a range from 40% to 160% of a arithmetic means amplitude, while that in the other conductor of the pair is simultaneously decreased within a range from 160% to 40% of a arithmetic mean amplitude.

8. Apparatus according to claim 1, in which the selection of successive pairs of conductors in an X or Y direction enables an X or Y coordinate of a line representing a local null of magnetic flux to be propagated progressively from one side of the digitiser table to the other, thereby to facilitate an accurate measurement of time to be used to provide a precise indication of distance across the digitiser table, first in the X-direction and then in the Y-direction.

9. Apparatus as claimed in claim 1, wherein the currents applied to two adjacent conductors and whose amplitude ratio define a precise position of the sensor means are applied in the form of synchronised pulses of defined amplitudes and rise-times.

10. Apparatus according to claim 1, in which the sets of parallel conductors comprising the X set and the Y set are each subdivided into two interlaced subsets, one subset comprising even conductors of the set, the other subset comprising odd conductors of the set, such that when two conductors are energised as a pair, they are consecutive conductors of a subset, two odd-numbered conductors forming one pair while two even-numbered conductors form the next pair to be energised.

11. Apparatus according to claim 10, in which electronic digital switching circuits are used to steer current pulses into appropriate conductors and to vary the amplitudes of the currents in these conductors such that at least one of them is gradually varied in steps of amplitude, in order to vary the ratio between them in a predetermined manner.

12. Apparatus according to claim 11, in which the ratios of the two currents applied to a pair of conductors are related to address coordinates of a PROM and the output from a selected address provides a signal linearly related to the X (or Y) coordinate of a point on the digitiser table at which the normal components of the magnetic fields produced by the two currents just cancel, successive current ratios not necessarily resulting in equal steps of position across the surface.

13. Apparatus according to claim 11, in which the amplitudes of the two currents applied to a pair of parallel conductors are defined by output signals from a Programmed Read Only Memory so that currents in successive ratios cause a line of null magnetic field component perpendicular to the plane of the digitiser surface to move across the surface in equal increments.

14. Apparatus accordng to claim 11, in which the resolution of the digitiser may be varied by selecting different sets of addresses in a PROM in order to change the magnitude of incremental steps in energising current, according to requirements of different applications.

15. Apparatus according to claim 14, in which a programmable Read Only Memory may be used to compensate for any intrinsic mechanical errors in the construction of a digitiser surface whereby the spacing or parallelism of the conductors in a set may be imperfect.

16. Apparatus according to claim 1, in which a high speed coarse scan is used to locate the approximate position of the pen or cursor on the digitiser table so that it is only necessary thereafter to energise one or two pairs of conductors in each of the X and Y directions in order to locate the pen or cursor to full accuracy of which the method is capable.

17. Apparatus according to claim 1, in which operation is controlled and synchronised by outputs from a microprocessor.

18. Apparatus according to claim 1, in which logic circuity is implemented and operation is controlled by hardware in the form of specially masked Uncommitted Logic Array modules.

* * * * *